G. BARDI.
SIGNAL DEVICE FOR AUTOMOBILES.
APPLICATION FILED JAN. 10, 1918.
1,381,268.
Patented June 14, 1921.
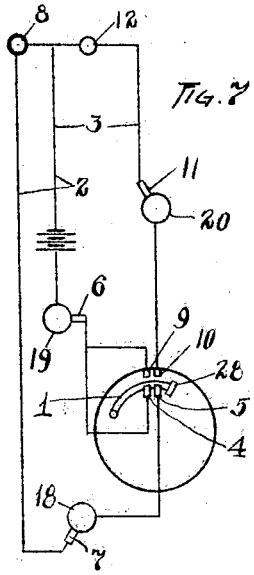
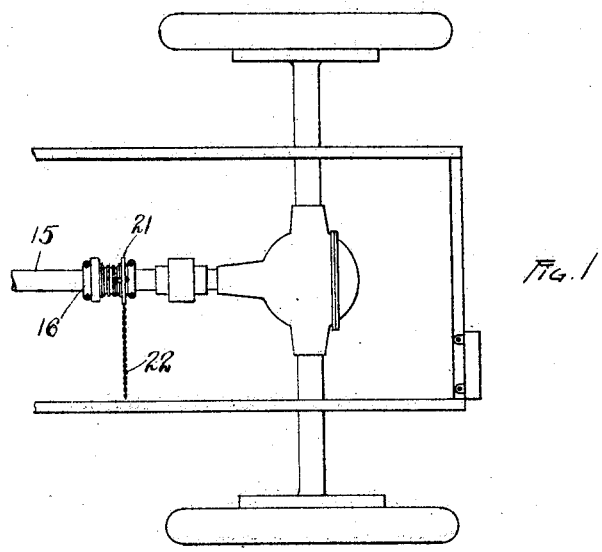
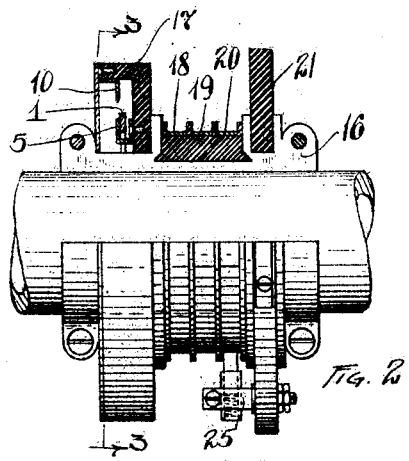
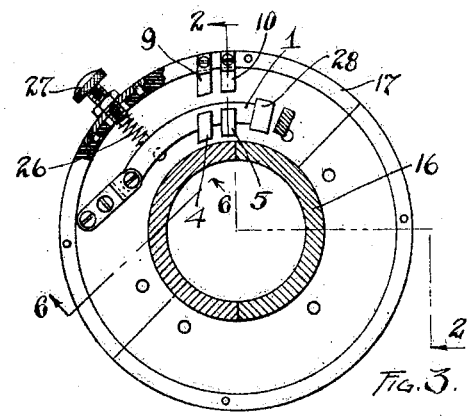
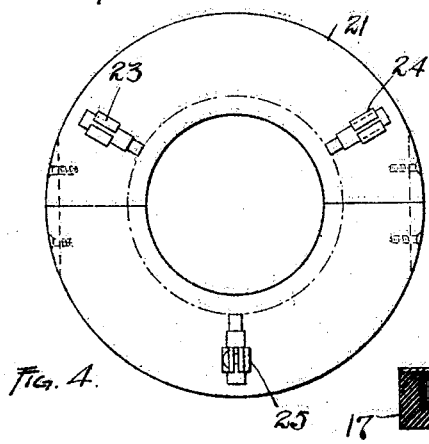
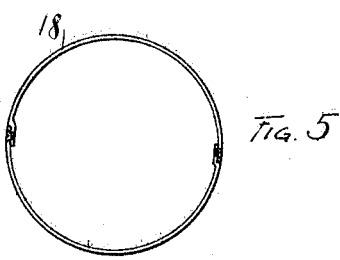
INVENTOR
Gino Bardi.
BY Fay, Oberlin & Fay
ATTORNEYS

UNITED STATES PATENT OFFICE.

GINO BARDI, OF CLEVELAND, OHIO.

SIGNAL DEVICE FOR AUTOMOBILES.

1,381,268.   Specification of Letters Patent.   Patented June 14, 1921.

Application filed January 10, 1918. Serial No. 211,280.

*To all whom it may concern:*

Be it known that I, GINO BARDI, a subject of the King of Italy, who has taken out his first naturalization papers in the United States, and a resident of Cleveland, county of Cuyahoga, and State of Ohio, have invented a new and useful Improvement in Signal Devices for Automobiles, of which the following is a specification, the principle of the invention being herein explained and the best mode in which I have contemplated applying that principle, so as to distinguish it from other inventions.

The present invention, relating as indicated to a signal device for automobiles, is designed to provide an automatic warning to a following vehicle of the slowing down or stopping of the automobile provided with such device. Since an automobile almost invariably must slow down in order to turn, this same device serves as a cautionary signal whenever the automobile provided with it is about to make a turn. In addition to being entirely automatic, the device is simple and inexpensive to construct, being at the same time adapted for application to vehicles of a type at present in use.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1 is a plan view of a portion of an automobile chassis with my improved signal device mounted thereon; Fig. 2 is a side elevation of said device on a larger scale, with a portion thereof shown in axial section; Fig. 3 is a transverse section taken in the main on the plane indicated by the line 3—3, Fig. 2; Fig. 4 is an elevational view of one element of the device and of the series of contact brushes carried thereby; Fig. 5 is a detail view of one of the contact rings, wherewith said brushes coöperate; Fig. 6 is a transverse section taken on the plane indicated by the line 6—6, Fig. 3; and Fig. 7 is a diagrammatic view of the wiring connections.

The device proper comprises, as illustrated in detail in Figs. 2 to 6, inclusive, a centrifugally controlled switch 1, that serves to close one or the other of two circuits 2 and 3. A diagram of these circuits is found in Fig. 7, from which it will be seen that when one is closed through contacts 4 and 5 and brushes 6 and 7, a red light 8 is thrown in circuit, while when the other is closed through contacts 9 and 10 and brushes 6 and 11, a green light 12 is thrown in circuit. It will be understood that such red and green lights are merely illustrative of any suitable electrically operated indicator, and that a small semaphore arm, signal, bell, or any other form of indicator may be substituted therefor.

The signal device proper is designed to be mounted on the propeller shaft 15 of an automobile (Fig. 1), and all its parts are split so as to render it possible to directly mount the same on such a shaft without taking the latter down. The main member of the device accordingly comprises a split sleeve 16 adapted to be non-rotatably clamped on to such shaft. To such sleeve is in turn non-rotatably secured a disk 17 of insulating material to which is pivotally attached the switch 1 presently to be described in more detail, and also non-rotatably three contact rings 18, 19 and 20 suitably insulated from each other as shown.

In addition to the foregoing, a second disk 21, shown in side elevation in Fig. 4, is rotatably mounted upon the sleeve, this disk being connected by means of a chain 22 or other flexible element with the frame of the vehicle, so that it is normally held against turning, while the shaft, with the other parts non-rotatably attached thereto, rotate freely. This last-mentioned disk is provided with three brush holders 23, 24, and 25 carrying brushes of carbon or other suitable material that are adapted to contact with the rings 18, 19 and 20, respectively. It will be understood that wires are connected with these brush holders, in accordance with the diagram shown in Fig. 7.

The first mentioned disk 17 carries the two sets of contacts 4, 5 and 9, 10, between which is oscillatorily mounted the switch 1 adapted in one position to connect the two innermost, and, in another position, the two outermost contacts. A spring 26, the action of which may be adjusted by means of a screw 27, serves normally to hold the switch in the position shown in Fig. 3, where it closes the inner contacts, but the free end of the switch is provided with a weight 28 that, under the centrifugal force developed upon the rotation of the device, causes the switch to disengage such inner contacts and close the outer contacts. The wiring connections to the two pair of contacts are likewise shown in Fig. 7, from which it will be seen that one contact of each set is connected with the central of three rings, while the other contacts are connected with the two remaining rings, respectively. It thus follows that when the switch is in the position shown in Figs. 3 and 7, the red light, or equivalent device, is in circuit, while, if the switch be thrown into its outer position, the other light or device is rendered operative.

By suitable adjustment of the set screw 27, the speed at which the switch will shift from one position to the other may be accurately gaged; for example, a dropping of the speed of the vehicle to five miles an hour may warrant giving the cautionary signal, and in such event the device is adjusted so that the switch closes the inner contacts whenever the speed drops below five miles, and closes the outer contacts at all speeds above that just stated. The device, it will be observed, is not only exceedingly simple in construction and so unlikely to get out of order, but may be readily applied to a stock automobile without requiring any remodeling of the same. The advantage in having such a signal device entirely automatic is, of course, obvious, since the driver of a car under circumstances most likely to create an emergency is least prepared to give a manual signal or manually operate a signal device.

It is understood that the lamps 8 and 12 will be carried in a suitable housing or box 30, corresponding in most cases with the tail light of the automobile, although such location is, of course, a matter of indifference so far as the principle of operation is concerned. It should also be explained that the contact rings on the device proper, together with the contacts themselves carried by the relatively rotatable disk, will be desirably inclosed in a suitable housing. It has not, however, been deemed necessary to illustrate such housing.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, a propeller shaft or like part of a vehicle; a split sleeve clamped on said shaft so as to rotate therewith; a disk of insulating material and a plurality of contact rings nonrotatably mounted on said sleeve; a centrifugally actuated switch carried by said disk adapted to variously connect said rings; a second disk rotatably mounted on said sleeve; and brushes carried thereby arranged to contact with said rings, respectively, said brushes forming part of the circuit connections between said rings and an indicating means.

2. In a device of the character described, a propeller shaft or like part of a vehicle, a member carried by said shaft so as to rotate therewith, a centrifugally actuated switch carried by said member, a plurality of contact rings carried by said shaft so as to rotate therewith, a second disk carried by said shaft but normally held from rotation therewith, and brushes carried by said second disk for contact with said rings, said brushes forming part of a circuit connection between said rings and an indicating means.

Signed by me, this 7th day of January, 1918.

GINO BARDI.